United States Patent
Barrie et al.

[11] Patent Number: 5,217,085
[45] Date of Patent: Jun. 8, 1993

[54] LUBRICATION AND COOLING SYSTEM FOR A POWERTRAIN INCLUDING AN ELECTRIC MOTOR

[75] Inventors: Woodrow L. Barrie, Clarkston; George E. Lemieux, Livonia, both of Mich.

[73] Assignee: Ford Motor Company, Dearborn, Mich.

[21] Appl. No.: 878,357

[22] Filed: May 4, 1992

[51] Int. Cl.⁵ .................................................. F16N 7/08
[52] U.S. Cl. ................................ 184/104.1; 184/6.12; 184/6.22; 165/35; 236/93 R
[58] Field of Search ........... 184/6.12, 6.13, 6.22, 184/104.1, 104.2, 104.3; 74/467, 606 A; 236/34.5, 93 R, 101 D; 137/625.46; 165/35, 36, 37, 38; 310/62, 52, 54; 180/65.5, 65.6, 65.7

[56] References Cited

U.S. PATENT DOCUMENTS

| | | | |
|---|---|---|---|
| 2,268,653 | 1/1942 | Flowers | 184/6.13 |
| 2,374,639 | 4/1945 | Miller | 236/34.5 |
| 2,400,911 | 5/1946 | Booth | 184/6.13 |
| 4,137,997 | 2/1979 | Ando | 184/6.22 |
| 4,418,777 | 12/1983 | Stockton | 180/65.5 |
| 4,503,679 | 3/1985 | Saito et al. | 184/6.22 |
| 4,953,663 | 9/1990 | Sugden | 184/6.12 |
| 5,034,638 | 7/1991 | McCabria | 310/54 |
| 5,110,045 | 5/1992 | Glasson et al. | 236/101 D |
| 5,137,079 | 8/1992 | Anderson | 165/38 |
| 5,156,579 | 10/1992 | Wakuta et al. | 310/64 |

Primary Examiner—Ira S. Lazarus
Assistant Examiner—Alan B. Cariaso
Attorney, Agent, or Firm—Frank G. McKenzie; Roger L. May

[57] ABSTRACT

A hydraulic pump forces fluid from a sump supplied from a lubrication circuit and a cooling circuit that takes heat from an electric motor. The lubrication circuit is supplied with fluid directly from the discharge side of the pump and is returned directly to the sump. The cooling circuit, disposed in parallel arrangement with the lubrication circuit, has its volumetric flow rate from the discharge side of the pump controlled by a bimetallic valve, which opens and closes in accordance with the temperature of the fluid. When fluid temperature is low, the pump discharge is fully opened both to the lubrication circuit and the cooling circuit. When fluid temperature is relatively high, the pump discharge is directly entirely through a heat exchanger which transfers heat to a cooling air stream, and the fluid exiting the heat exchanger is delivered to the cooling circuit. The speed of the pump is controlled in accordance with a signal produced by a temperature sensor mounted on a traction motor.

12 Claims, 2 Drawing Sheets

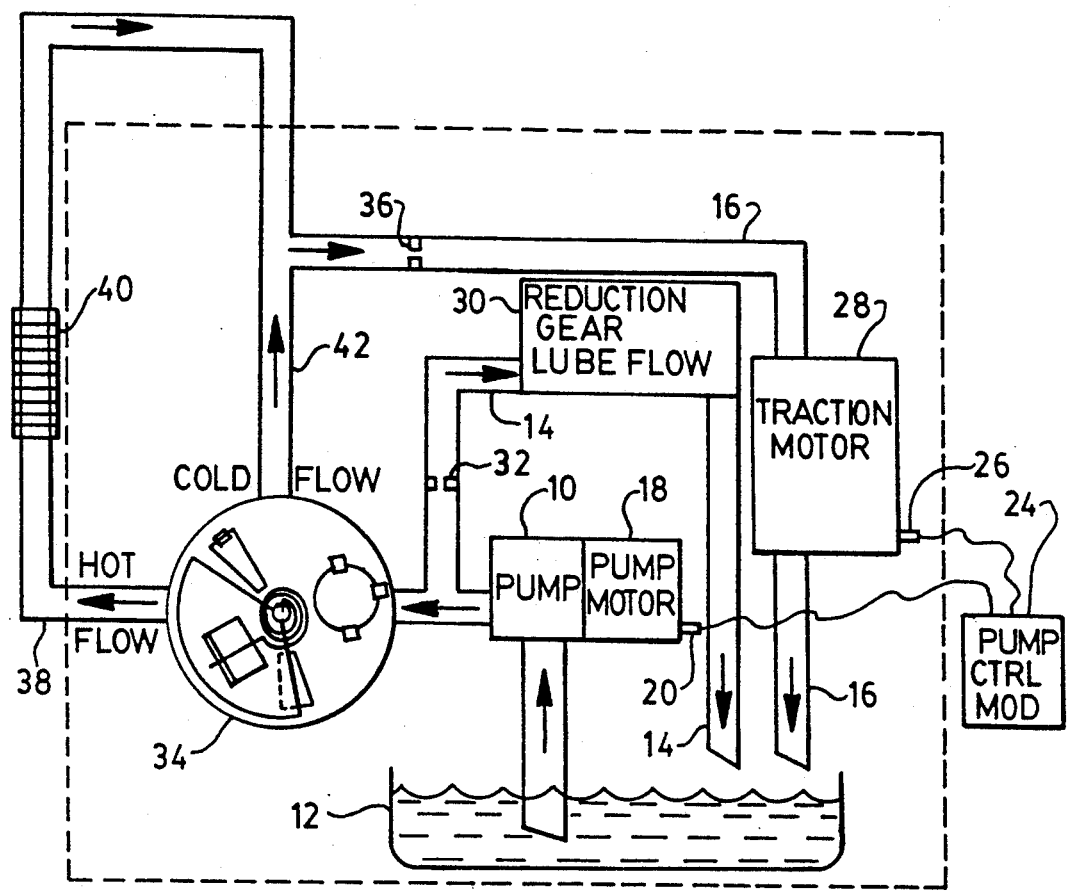
FIG 1
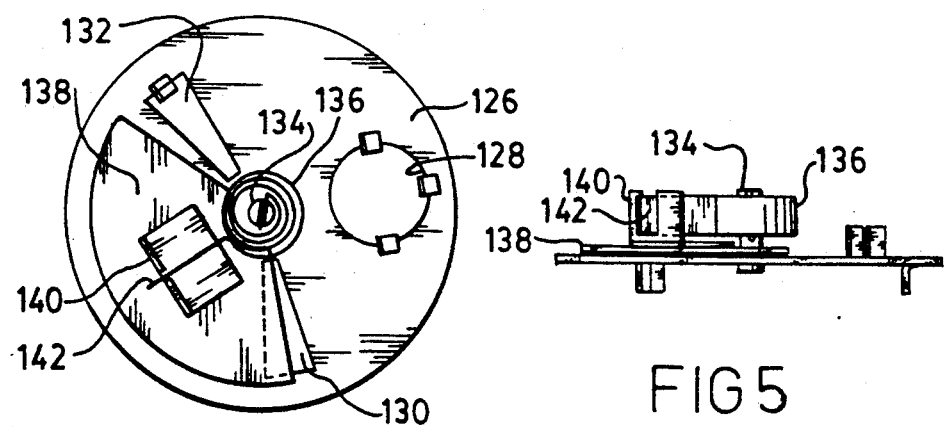
FIG 4
FIG 5

LUBRICATION AND COOLING SYSTEM FOR A POWERTRAIN INCLUDING AN ELECTRIC MOTOR

BACKGROUND OF THE INVENTION

1. Field of the Invention

This invention pertains to a hydraulic system that supplies fluid to a heat source and a circuit that requires a continual source of pressurized hydraulic fluid. More particularly, the invention is concerned with directing fluid in a cooling circuit to a heat exchanger or directly to a heating load on the basis of fluid temperature.

2. Description of the Prior Art

U.S. Pat. No. 4,418,777 describes a powertrain having a high speed a.c. motor, automatic transmission and final drive arranged on a common axis. A hydraulic supply, driven by a small motor, operates only occasionally to accommodate system leakage. A second electrically driven oil pump circulates oil to an oil cooler and supplies the lubrication system of the motor and transmission. A cooling circuit maintains the temperature of the electric motor within an acceptable range. Both pumps draw oil from a common sump that supplies fluid to the lubrication and cooling systems.

The stator of the motor is cooled by oil flowing from the rotor radially outward on the ends of the stator windings through the action of centrifugal force. The cooling fluid absorbs heat from the motor and returns by gravity to the sump from which the oil is carried to the oil cooling system. The oil cooler includes a small radiator with an electrically driven cooling fan that is activated upon demand to control the oil temperature. Heat from the oil is delivered to atmosphere or can be used to heat the passenger compartment.

Fluid returning to the motor-transmission assembly from the oil cooling system circulates within the transmission to lubricate surfaces requiring lubrication.

The traction motor cooling system described in the '777 patent may reduce traction motor efficiency because of a reduction in the flux path area and will not cool a traction motor when vehicle speed is low. The cooling medium may remain at a low temperature for an extended period of time because all the lubrication and cooling fluid must pass through an external cooler where heat is exchanged between the circulating fluid and ambient atmosphere.

SUMMARY OF THE INVENTION

The hydraulic system of the present invention includes a lubrication circuit and a cooling circuit in parallel with the lubrication circuit. The parallel arrangement provides uncooled fluid having relatively low viscosity to the lubrication circuit, thereby minimizing losses due to high viscosity oil circulating through a gear box or other mechanical equipment. The cooling circuit is controlled with a temperature-sensitive bimetallic valve, which bypasses an oil cooler and directs fluid to a cooling circuit to allow rapid heating of the oil by the motor or, when fluid temperature is high, directs fluid to an oil cooler and then to the cooling circuit. Rapid heating of the oil minimizes the energy required to pump high viscosity, cold oil through both the cooling circuit and the lubrication circuit. The bimetallic valve progressively opens the bypass line and the oil cooler line as the temperature of the fluid changes. This action further reduces pump-motor current and increases the overall efficiency of this system. If required, the bimetallic valve directs all the cooling oil through the external cooler for maximum heat rejection.

In realizing these objectives and advantages, an hydraulic system of this invention includes an hydraulic pump supplied with fluid from a sump containing fluid from the lubrication circuit and cooling circuit.

In another form of this invention, a tractionmotor is supplied with fluid drawn from a reservoir and pumped through a pressure regulator valve, which supplies the lubrication system when system pressure and pump speed are low, and directs fluid increasingly to the traction motor as system pressure rises in response to higher pump speed.

A motor temperature sensor produces an electrical signal used to control the state of a solenoid-operated temperature control valve. When temperature is low, the solenoid is off and fluid in the cooling circuit is directed by the temperature control valve directly to the reservoir. However, when temperature rises, the solenoid opens the temperature control valve to the discharge side of the hydraulic circuit pump. This action causes the temperature control valve to change state, thereby reducing the volumetric flow rate between the motor and the reservoir and increasing the flow rate between the motor and a heat exchanger, wherein heat is exchanged from the fluid to ambient atmosphere. Flow leaving the heat exchanger returns directly to the reservoir.

The state of the temperature control valve may be determined instead by a temperature-responsive thermostatic element rather than the on/off electrical solenoid, in another embodiment of the invention. The thermostatic element expands due to high temperature fluid leaving the motor in the cooling circuit. The expansion of the thermostatic element changes the state of the temperature control valve such that the volumetric flow rate in the direct path between the motor and the reservoir reduces as temperature increases and the flow rate between the motor and the heat exchanger increases as temperature rises.

BRIEF DESCRIPTION OF THE DRAWINGS

FIG. 1 shows in schematic form a hydraulic system that supplies a lubrication circuit and cooling circuit according to the invention.

FIG. 4 is a top view of the bimetallic valve that regulates the system of FIG. 1.

FIG. 5 is a side view of the bimetallic valve of FIG. 1.

DESCRIPTION OF THE PREFERRED EMBODIMENT

Figure 2:
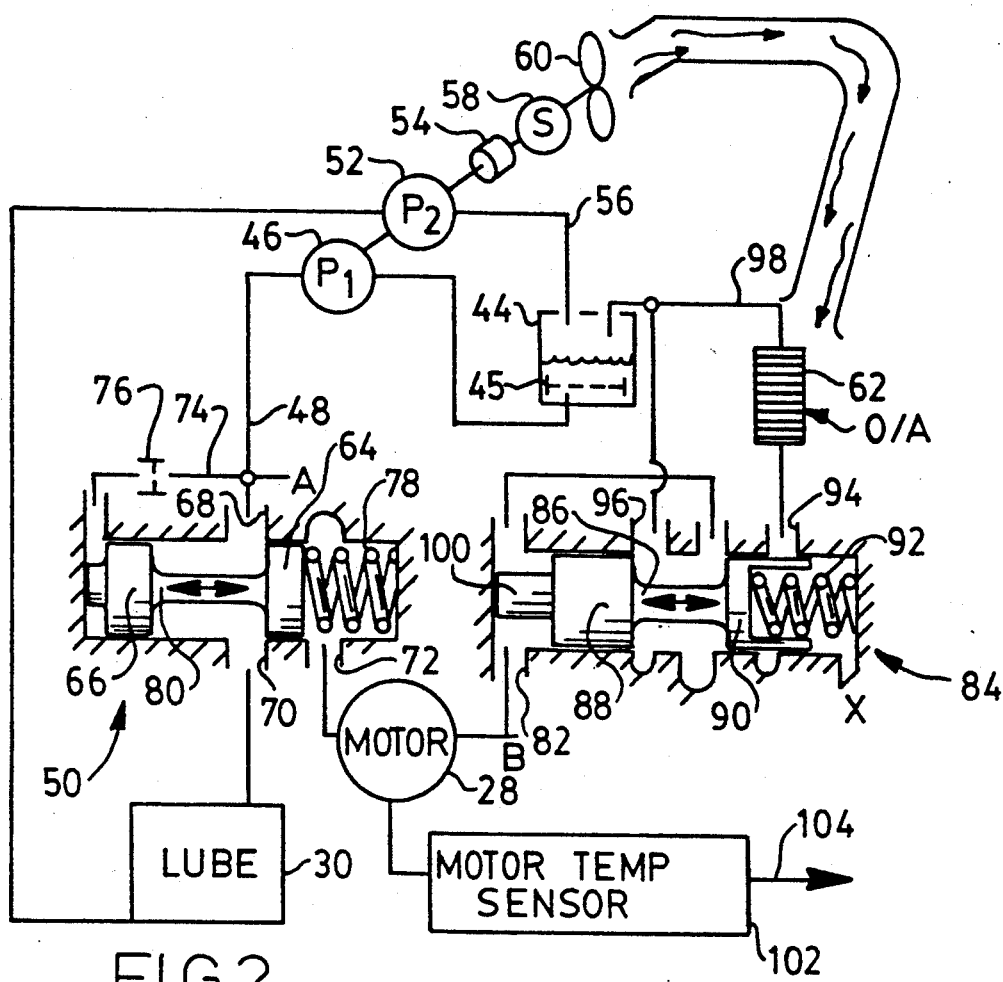
FIG. 2 is a hydraulic system, which supplies a lubrication circuit through a pressure regulator valve and cooling circuit through a temperature control valve.

Referring first to FIG. 1, a hydraulic pump 10 has its inlet side connected to a sump 12 containing hydraulic fluid returned there from a lubrication circuit 14 and a cooling circuit 16. The pump is driven by an electric motor 18, whose power supply 20 is connected to a pump control module 22, supplied with a signal carried on line 24 connected to a temperature sensor 26, or a group of temperature sensors located on the stator windings and/or rotor ends of a traction motor 28.

The traction motor is used in an electrically driven automotive vehicle to turn the drive wheels of the vehicle through a transmission 30, in which a reduction from the speed of the motor to the speed of the output shaft of the transmission occurs. The discharge side of pump 10 is connected directly through the first flow control orifice 32, located in the lubrication circuit 14, through which the lubrication system of the transmission 30 is supplied and from which transmission the flow returns to the sump 12.

Located in parallel with the lubrication circuit 14 is a cooling circuit 16, connected to the discharge side of pump 10 through a bimetallic valve 34 and a second flow control orifice 36. Fluid in the cooling circuit is sprayed on the stator windings and rotor ends of the traction motor, heated by conduction by passing over the traction motor, and returns by gravity feed through a circuit 16 to the sump 12.

The discharge side of pump 10 is connected through bimetallic valve 34 to a line 38 disposed in parallel with cooling circuit 16 and lubrication circuit 14. Line 38 includes a heat exchanger or oil cooler 40, wherein heat contained in the hydraulic fluid is exchanged to an air stream forced by a fan through the heat exchanger. Fluid flowing through line 38 joins flow from the bimetallic valve 34 and circuit 16 and passes through orifice 36 to the traction motor.

The bimetal valve 34 controls fluid temperature in the lubrication circuit by proportioning the volume of flow through heat exchanger 14 as a function of fluid temperature at valve 34. FIGS. 4 and 5 show the structure of the bimetal valve 34 that controls flow in the system of FIG. 1. A circular plate 126 contains a aperture 128 communicating with the discharge side of pump 10, aperture 130 leading to line 38, and aperture 132 connected to line 42. Plate 126 supports a pin 134 and a coiled bimetal element 136 encircling the pin. A control element 138, in the form of a circular segment, includes a flange 140 that extends vertically from the surface of element 138, the flange having a slot into which is fitted the outer end or tab 142 of element 136. Control element 138 pivots about the axis of pin 134 due to changes in fluid temperature, which influences the angular position of the control element 138.

The bimetal element has a thickness comprising at least two metals having dissimilar coefficients of thermal expansion. As the temperature of element changes due to temperature changes in the fluid that enters valve 34 through aperture 128, the radius of curvature of element 136 changes and the position of element 138 opens and closes apertures 130 and 132 in response to the fluid temperature changes.

When the vehicle ignition switch is initially turned on, a timer is initialized and started so that pump motor 18 runs at full speed, 3600 rpm., for about 15 seconds. Otherwise if temperature sensor 26 indicates a motor temperature of about 160° F. and vehicle speed is below about 0.90 mph., the pump control module transmits a pulse width modulated PWM signal duty cycle to the pump power supply 20. Preferably the duty cycle is about 50 percent at low temperature and increases linearly to 100 percent at high temperature. The duty cycle effectively changes the electric current applied to the motor power supply 20 and the motor speed varies with the magnitude of power supply current.

In operation the system provides a quick warm up of the hydraulic fluid in the circuits due to the parallel disposition of the lubrication and cooling circuits. The bimetallic valve reduces flow in line 38 to the heat exchanger 40 when the oil is cool in order to allow rapid heating of the oil at the motor. This minimizes losses associated with high viscosity hydraulic fluid. When the fluid reaches a predetermined temperature, valve 34 opens circuits 16 and 38 so that there are both internal and external paths for cooling flow. This further reduces the electric current supplied to the pump motor 18 and increases overall system efficiency. When fluid temperature increases further, the bimetallic valve 34 closes passage 42 between the pump discharge and cooling circuit 16 and fully opens passage 38 to the heat exchanger, thereby maximizing the heat exchange to ambient atmosphere.

Referring now to FIG. 2, the traction motor 28, located in transmission lubrication circuit 30, is supplied from reservoir 44 from which hydraulic fluid is drawn from below fluid filter 46 to supply fluid to the input side of pump 45. The discharge side of pump 46 is connected to line 48 and carries fluid to pressure regulator valve 50. A sump pump 52, arranged coaxially with pump 46 and driven by a motor 54, can be used to draw fluid from the lubrication circuit 30 and to supply the reservoir 44 through line 56. A magnetic clutch 58 is used selectively to engage and disengage a drive connection between motor 54 and a fan 60, which forces an air stream at high velocity through a heat exchanger 62.

Pressure regulator valve 50 includes a first control land 64, second land 66, input port 68, output ports 70 and 72, a feedback passage 74, and feedback orifice 76. Initially, when the vehicle is started, the speed of pump 46 is fairly low, about 1000 rpm. In that condition, valve 50 is in the state shown in FIG. 2. The lubrication circuit 30 is fully opened to the discharge side of pump 46 and the cooling circuit, through which motor 28 is supplied, is closed entirely by the biasing action of compression spring 78 forcing the valve spool 80 to the extreme left hand end of its range of motion. As pump speed increases, pressure in the lubrication circuit 30 increases. A pressure force on the end of land 66, produced by feedback line 74, forces valve spool 80 rightward against the effect of compression spring 78, thereby opening a connection between the discharge side of pump 46 and outlet port 72 to the motor cooling circuit.

Pump 46 is a constant displacement pump; therefore the flow rate through passage 48 varies in proportion to the pump speed. When pump speed declines, output port 72 is closed by land 64 because compression spring 78 forces spool 80 leftward. In this way, pressure regulator valve 50 permits pressure in the lubrication circuit to rise to a predetermined pressure determined by effective compression spring 78 and the feedback pressure forced developed on the face of land 66. If pressure in the lubrication circuit increases above the predetermined pressure, a portion of the flow discharged by pump 46 is directed to output port 72 and the motor cooling circuit.

Fluid that leaves pressure regulator valve 50 through port 72 is carried in lines that conduct heat from the stator windings and rotor ends of motor 28. Fluid heated by the motor is directed through port 82 to temperature control valve 84, which includes a valve spool 86 having first and second lands 88, 90, compression spring 92, and output ports 94, 96. Port 94 directs hydraulic fluid to a heat exchanger 62, where heat in the circulating fluid is transferred to an air stream. Port 96 directs hydraulic fluid from valve 84 directly to line 98, which carries fluid from heat exchanger 62 to reservoir 44. The temperature control valve also includes a thermostatic element 100, an element having high coefficient of expansion of the type that is commonly used in a thermostat of a liquid-cooled internal combustion engine to control temperature at which the engine coolant is able to flow into a radiator from the engine block.

When temperature of the fluid passing through the motor is low, temperature control valve 84 is in the position shown in FIG. 2. In this state, valve 84 closes output port 94 and there is no flow through the heat exchanger 62. Instead, all of the flow is directed through the valve directly to the reservoir 94. However, when the fluid temperature increases, the thermostatic element 100 increases in length, forces the spool 86 rightward tending to open the output port 94 and to close output port 96. In this way, valve 84 reduces the volumetric flow rate that flows directly to reservoir 94 and increases the volumetric flow rate through the heat exchanger until, as temperature rises to a predetermined level, output port 96 is entirely closed and port 94 is entirely opened. At that point, substantially all of the flow that passes over the motor windings and rotor flows through the heat exchanger so that a large quantity of heat is removed from the fluid before it is returned to the reservoir.

Figure 3:
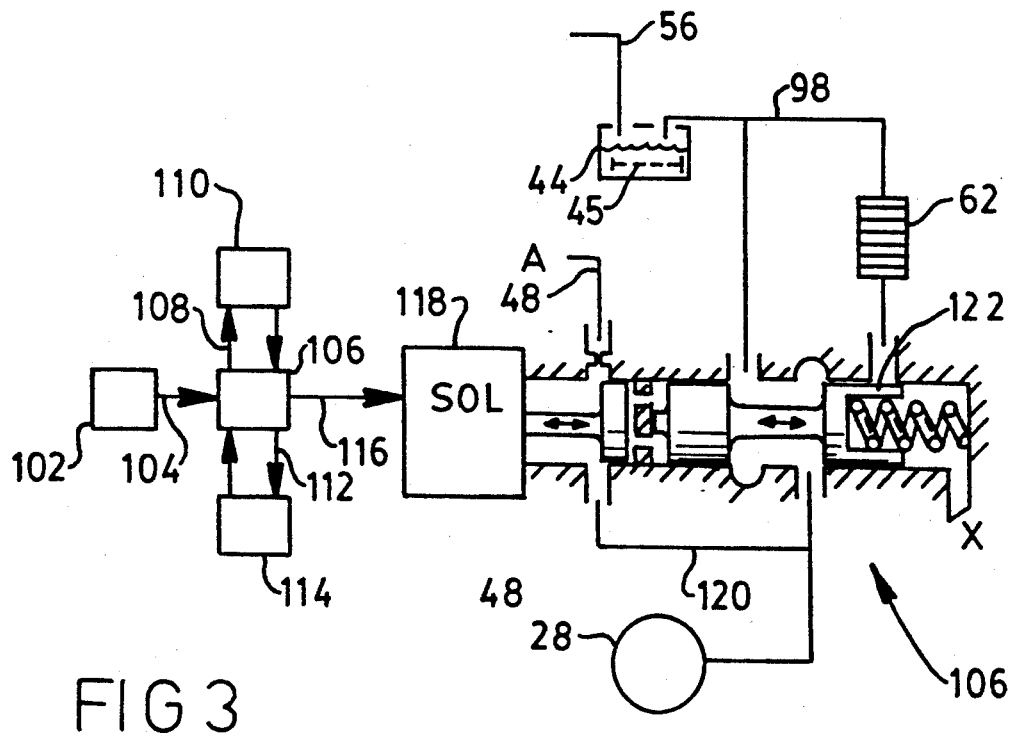
FIG. 3 shows an alternate form of a temperature control valve for regulating the flow rate from the pump directly to the reservoir and through a heat exchanger to the reservoir.

FIG. 3 shows a temperature control valve 106 that can be used in place of control valve 84 in a cooling circuit provided the system is modified so that the output of a motor temperature sensor 102 is employed. A temperature sensor 102, mounted on the stator windings or rotor ends of motor 28 produces an output signal 104 representing the magnitude of the motor temperature. An electronic processor 106 is connected through data buses 108, which communicate with control logic 110, and buses 112, which communicate with electronic memory 114. The processor receives the temperature signal 104 as input and employs the control logic and data stored in electron memory to produce a control signal 116 that is supplied to an electrical solenoid 118 having the capacity to open and close passage 48, connected to the discharge side of pump 46.

Solenoid 118 is an on/off solenoid. It responds to signal 116 such that, when motor temperature sensor 102 indicates a high temperature, the solenoid opens communication between passages 48 and 120 by moving control land 124. This action produces a pressure force on the lefthand end of the spool of valve 106 in opposition to the force of the compression spring, opens valve 106 and allows fluid from motor 28 through valve 106 and passage 98 directly to reservoir 44. The solenoid 118 closes output port 122 so that none of the fluid passes through heat exchanger 62. When the motor temperature sensor indicates low temperature, processor 106 produces a signal 116, which switches solenoid 118 off, closes passage 48 and allows valve 106 to move to the position shown in FIG. 3, where fluid from the motor 28 is returned directly through passage 98 and valve 106 to the reservoir 44.

We claim:

1. In a powertrain that includes an electric motor having a motor cooling circuit, and a mechanical transmission assembly having a lubrication circuit, a system for supplying fluid that lubricates the transmission and cools the motor, comprising:
a source of pressurized fluid;
a first flow path connecting the fluid pressure source, the lubrication circuit, and a sump;
a second flow path disposed in parallel with the first flow path, connecting the fluid pressure source, the motor cooling circuit, and the sump;
a third flow path disposed in parallel with the first flow path, connecting the fluid pressure source, a heat exchanger wherein heat is taken from the fluid, and the second flow path between the fluid pressure source and the motor cooling circuit;
bypass means operative in response to fluid temperature for directing fluid to the heat exchanger and to the second flow path directly.

2. The system of claim 1 wherein the bypass means reduces flow to the heat exchanger and increases flow to the second flow path as fluid temperature falls, and increases flow to the heat exchanger and decreases flow to the second flow path as fluid temperature rises.

3. The system of claim 1 wherein the bypass means stops flow to the heat exchanger and directs substantially all flow from the fluid pressure source to the second flow path when fluid temperature reaches a first predetermined magnitude.

4. The system of claim 1 wherein the bypass means stops flow to the second flow path and directs substantially all flow from the fluid pressure source to the heat exchanger when fluid temperature reaches a second predetermined magnitude.

5. The system of claim 1 wherein the bypass means is a bimetallic direction control valve.

6. The system of claim 1 wherein the first and second flow paths each include a flow control orifice.

7. In a powertrain that includes an electric motor and equipment requiring lubrication, a system for supplying fluid that lubricates the equipment and cools the motor, comprising:
a source of pressurized fluid;
a first flow path connecting the fluid pressure source and a lubrication circuit connected to the equipment;
a second flow path disposed in parallel with the first flow path, connecting the fluid pressure source and a cooling circuit connected to the motor;
a third flow path disposed in parallel with the first flow path, connecting the fluid pressure source, a heat exchanger wherein heat is taken from the fluid, and the second flow path between the fluid pressure source and the cooling circuit; and
bypass means operative in response to fluid temperature for directing fluid to the heat exchanger and to the second flow path directly.

8. The system of claim 7 wherein the bypass means reduces flow to the heat exchanger and increases flow to the second flow path as fluid temperature falls, and increases flow to the heat exchanger and decreases flow to the second flow path as fluid temperature rises.

9. The system of claim 7 wherein the bypass means stops flow to the heat exchanger and directs substantially all flow from the fluid pressure source to the second flow path when fluid temperature reaches a first predetermined magnitude.

10. The system of claim 7 wherein the bypass means stops flow to the second flow path and directs substantially all flow from the fluid pressure source to the heat exchanger when fluid temperature reaches a second predetermined magnitude.

11. The system of claim 7 wherein the bypass means is a bimetallic direction control valve.

12. The system of claim 7 wherein the first and second flow paths each include a flow control orifice.

* * * * *